United States Patent
Belser et al.

(10) Patent No.: US 6,349,079 B1
(45) Date of Patent: Feb. 19, 2002

(54) SYSTEM AND METHOD FOR DETECTING A HEAD POSITIONING ERROR WITHIN A COMPUTER MEMORY DEVICE

(75) Inventors: Karl A. Belser, San Jose; Lawrence M. Bryant, Palo Alto; John H. Richards, San Jose, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/414,745

(22) Filed: Oct. 8, 1999

Related U.S. Application Data

(60) Provisional application No. 60/103,694, filed on Oct. 9, 1998.

(51) Int. Cl.[7] .................................................. G11B 7/00
(52) U.S. Cl. ............................... 369/44.26; 369/44.34; 369/53.28
(58) Field of Search ........................... 369/44.25, 44.26, 369/44.34, 47.36, 47.38, 47.4, 47.41, 47.45, 47.48, 53.3, 53.29, 53.28; 360/77.05, 77.08

(56) References Cited

U.S. PATENT DOCUMENTS

| | | | |
|---|---|---|---|
| 5,134,601 A | 7/1992 | Greenwell et al. | 369/44.26 |
| 5,245,491 A | 9/1993 | Horie et al. | 360/114 |
| 5,270,991 A | 12/1993 | Verboom | 369/44.26 |
| 5,295,127 A | 3/1994 | Verboom et al. | |
| 5,327,408 A | 7/1994 | Belser | 369/44.26 |
| 5,412,631 A | 5/1995 | Komma et al. | 369/44.37 |
| 5,493,561 A | 2/1996 | Nishiuchi et al. | 369/275.1 |
| 5,511,063 A | 4/1996 | Kawase | 369/275.3 |
| 5,574,706 A | 11/1996 | Verboom et al. | 369/44.26 |
| 5,587,992 A | 12/1996 | Hayashi | 369/275.4 |
| 5,617,406 A | 4/1997 | Onagi et al. | 369/275.3 |

FOREIGN PATENT DOCUMENTS

EP            0283017 A1     9/1988

OTHER PUBLICATIONS

"Handbook of Magneto–Optical Data Recording," Edited by Terry W. McDaniel and Randall H. Victora, Copyright 1997, Noyes Publications, p. 148.

*Primary Examiner*—Paul W. Huber
(74) *Attorney, Agent, or Firm*—Simon & Koerner LLP; Nancy R. Simon

(57) ABSTRACT

A system and method are provided for processing signals in a magneto-optical computer memory device to detect mispositioning of a head with respect to a track centerline. A light beam is scanned over a first and a second set of radially offset optically-detectable position marks formed in the rotating medium surface. A detector receives the reflected light beam and responsively generates a position signal having a plurality of pulses corresponding to the position marks. The position signal is then passed through a differentiator circuit. The differentiated position signal may then be applied to low pass filter and resonator circuits, and is subsequently conveyed to a finite time integrator for rectification and detection of the areas of the pulses associated with the first and second set of position marks. Mispositioning of the head is detected by comparing the pulse areas of the first and second set of position marks.

20 Claims, 11 Drawing Sheets

SYSTEM AND METHOD FOR DETECTING A HEAD POSITIONING ERROR WITHIN A COMPUTER MEMORY DEVICE

CROSS-REFERENCE TO RELATED APPLICATIONS

This application is related to and claims the benefit of commonly assigned U.S. Provisional Patent Application No. 60/103,694, filed on Oct. 9, 1998 and entitled "Position Detection System for Optical Disk Servo." This application is additionally related to commonly assigned U.S. patent application Ser. No. 09/017,978, filed on Feb. 3, 1998 and entitled "System and Method for Generating Position Error Signals Within a Magneto-Optical Computer Memory Device." The subject matter of the foregoing applications is incorporated by reference.

BACKGROUND OF THE INVENTION

1. Field of the Invention

This invention relates generally to computer memory systems and more particularly to a system and method for detecting a head positioning error within a magneto-optical computer memory device.

2. Description of the Background Art

Efficient and economic storage of digital information is an important consideration of manufacturers, designers and users of computing systems. In magneto-optical (MO) storage devices, digital data is typically stored in tracks located on rotating disks of MO storage media. Close positioning of the adjacent disk tracks maximizes the amount of stored data on a storage disk, thus providing significant economic benefits to system manufacturers and users. Therefore, system designers frequently seek new and improved methods of reducing track pitch to permit greater storage capacity on the storage media.

Referring now to FIG. 1, a plan view of a surface 102 of a MO storage medium 100 is shown. In MO storage devices, digital data is typically written to and read from a series of concentric or spiral tracks 104 located within a plurality of data wedges or sectors 106 on the surface 102 of storage medium 100. In practice, the digital data is typically read from surface 102 of storage media 100 by projecting a laser-generated light spot from a read/write head (hereinafter "head", and not shown in the figure) onto a selected track 104 while storage medium 100 is rotating, and then sensing the polarization of light reflected back from storage media 100.

It is critical for the head to be accurately positioned above track 104 of rotating storage medium 100 during a read/write operation on that track. Several factors (for example, imperfections in track symmetry or an off-axis wobble of the drive motor) may cause the head to be positioned slightly off the center of track 104, thus requiring position correction of the head to achieve satisfactory performance.

Various methods are known in the art for detecting and correcting mispositioning of the head. One well-known correction technique employs pre-patterned media having position marks formed on the tracks within a plurality of servo sectors 110 to generate a position signal. The position marks typically comprise uniformly shaped and sized concave depressions (pits) or convex protrusions (bumps) formed in surface 102 of MO storage medium 100 which reduce the local reflectivity, thereby effectively attenuating the light reflected back to the head. Generally, the position marks are grouped into a first and second set of marks, referred to respectively as the "A" and "B" position marks. The "A" position marks are radially offset in a first direction from the track centerline by a predetermined distance. The "B" position marks are similarly offset from the track centerline by the same distance, but in a second direction opposite the "A" position marks.

Mispositioning of the head with respect to the track centerline is sensed as the light spot passes over the position marks and the head detects the amount of light reflected back. The resultant reflectivity waveform will include a first and a second set of pulses respectively corresponding to the "A" and "B" position marks. The magnitudes of the first and second sets of pulses may then be separately determined to derive a first magnitude representative of the aggregate magnitude of the pulses caused by the "A" position marks, and a second magnitude representative of the aggregate magnitude of the pulses caused by the "B" position marks. The first and second magnitudes are then compared to determine if a mispositioning error exists. Specifically, equal magnitudes are indicative of proper head positioning, whereas an inequality denotes a positioning error (i.e., a larger first magnitude indicates that the head is offset from the track centerline in the direction of the "A" position marks, and a larger second magnitude indicates a mispositioning in the direction of the "B" position marks).

A disadvantage of the foregoing technique is that the reflectivity waveform will vary according to the radial positioning of the selected track. In particular, the pulse amplitude is substantially invariant with respect to the track position, but the pulse width corresponding to a track positioned relatively closer to the media center is greater than the pulse width corresponding to a track located relatively distant from the media center. The difference in pulse width results from the dependence of the local velocity on the radial position, i.e., since the rotational speed is constant, the local velocity at a given track will be proportional to the track radius. Thus, the time required to scan the light spot over a position mark of constant dimension will be a function of the track radial position, and the pulse widths will vary accordingly. A second, related problem of prior art techniques of the foregoing description is that the reflectivity waveforms have a DC offset component which will vary with the track radial position.

The variation of the reflectivity waveform with track position, as well as the presence of a DC offset, are undesirable and may complicate or reduce the accuracy of the positioning error sensing process. Thus, there is a need in the art for an improved head mispositioning detection technique that avoids these and other problems.

SUMMARY OF THE INVENTION

In accordance with the present invention, a system and method are disclosed for detecting mispositioning of a head device in a magneto-optical (MO) drive. The MO drive includes at least one rotating medium having a large number of spiral or concentric, closely spaced tracks along which data are written and read. A first and a second set of position marks are disposed along each track. The first and second sets of position marks are radially offset in opposite directions and are equally spaced from the track centerline. The individual position marks comprise optically detectable surface features, such as concave depressions (pits) or convex protrusions (bumps), of uniform shape and dimension.

The MO drive additionally includes a head device, which is positioned adjacent a selected track. The head device has a radiation source for directing a beam of light onto the selected track, and a detector for sensing light reflected from the selected track. The detector is configured to responsively generate an electric reflection signal, which includes a first and second set of pulses corresponding to the first and second sets of position marks. The reflection signal is passed to a differentiator, which differentiates the reflection signal to produce a first and second set of differentiated pulses respectively corresponding to the first and second set of position marks.

The differentiated reflection signal may then be conveyed to a low pass filter and second order resonator in order to remove undesirable low- and high-frequency noise components and thereby increase the signal-to-noise ratio. The filtered signal is thereafter passed to a finite time integrator, which determines a first area of the differentiated pulses corresponding to the first set of position marks, and a second area of the differentiated pulses corresponding to the second set of position marks. Differentiation of the pulses compensates for the variation of pulse width with local velocity, such that the pulse area is substantially invariant with respect to the track radius, as well as to other factors affecting the local velocity. In addition, inclusion of a differentiator in the detection path removes DC signal components that interfere with accurate determination of the area of the pulses.

An area analyzer conventionally detects mispositioning of the head device with respect to the track centerline by comparing the first and second areas determined by the integrator. In accordance with a preferred embodiment of the invention, sequentially numbered tracks are alternately provided with position marks disposed along the track centerline at either a "C" position or a "D" position. As is common in the art, a quadrature relationship between the "A" and "B" position marks and the "C" and "D" position marks can be established thereby resulting in more reliable continuous determination of the head position.

DETAILED DESCRIPTION OF THE PREFERRED EMBODIMENT

The present invention comprises a system and method for detecting head mispositioning in a magneto-optical memory device, and generally includes a storage media for storing information, position marks formed on the storage media, a head device coupled to the storage media for sensing light reflected from the storage media, and position error analysis circuitry for processing signals representative of the sensed reflected light to thereby calculate a position error signal (PES).

Figure 1:
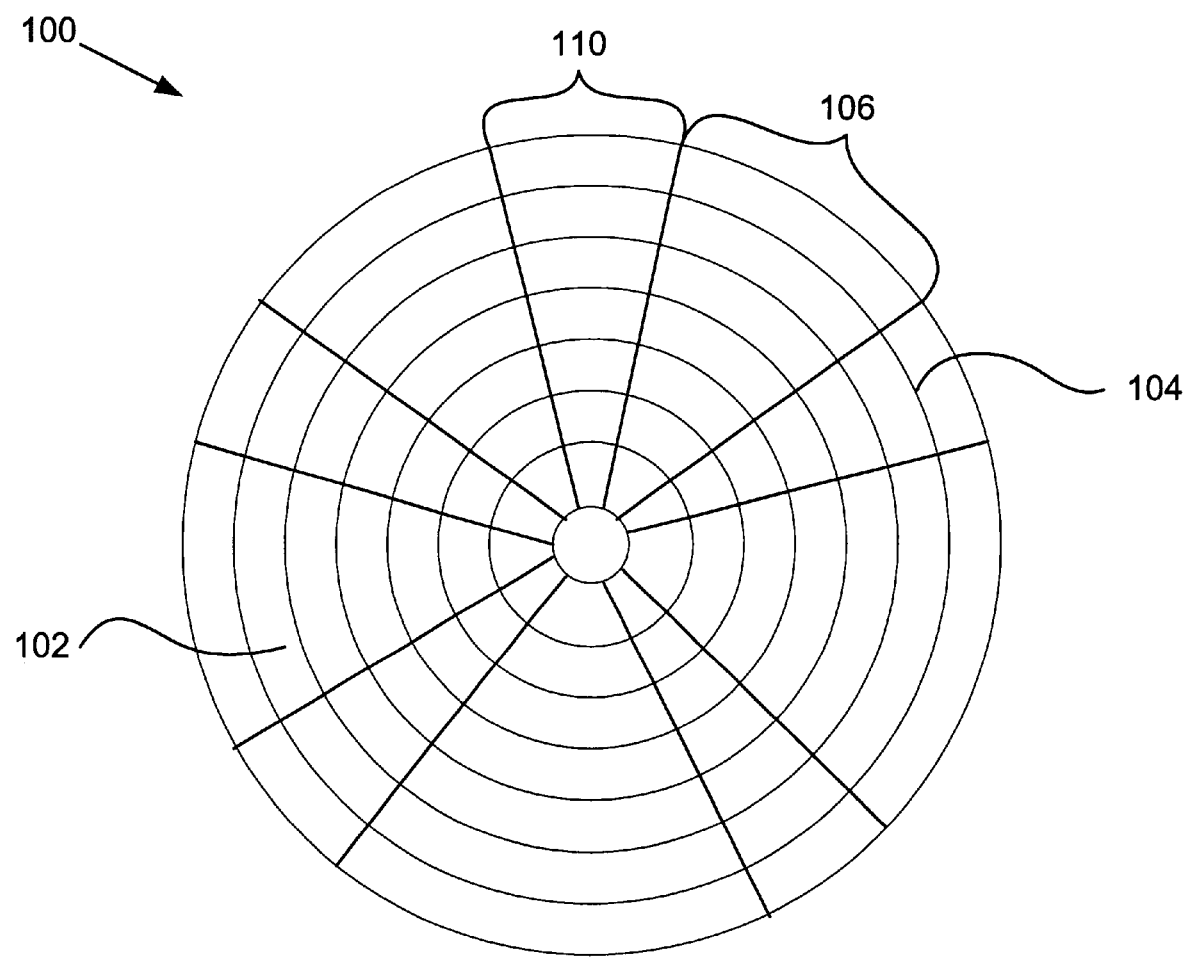
FIG. 1 is a plan view of a surface of exemplary MO storage media.
Figure 2:
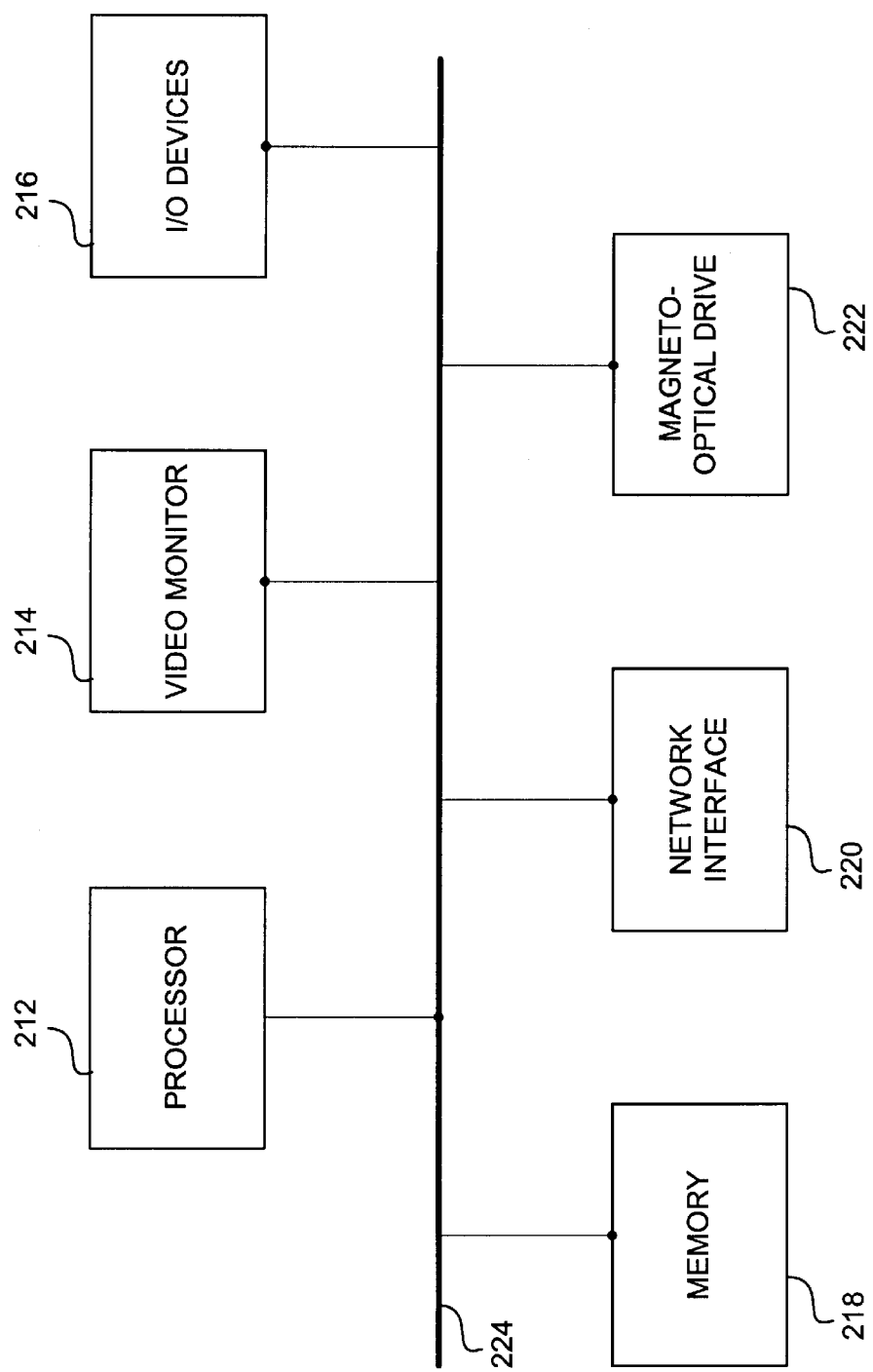
FIG. 2 is a block diagram of a computer system including a magneto-optical drive, according to the present invention.

FIG. 2 depicts in block form an exemplary computer 210 for implementing the present invention. Computer 210 preferably comprises a central processing unit (CPU) 212, a video monitor 214, an input device 216, a memory 218, a communications interface 220 and a magneto-optical (MO) drive 222. At least one common bus 224 couples the components of computer 210 for intercommunication. Memory 218 may comprise various configurations of random access memory (RAM), read-only memory (ROM) and non-volatile storage media such as floppy disks and CD-ROMs. MO drive 222 receives, stores and retrieves various types of digital information and is further discussed below in conjunction with FIGS. 3 through 10.

Figure 3:
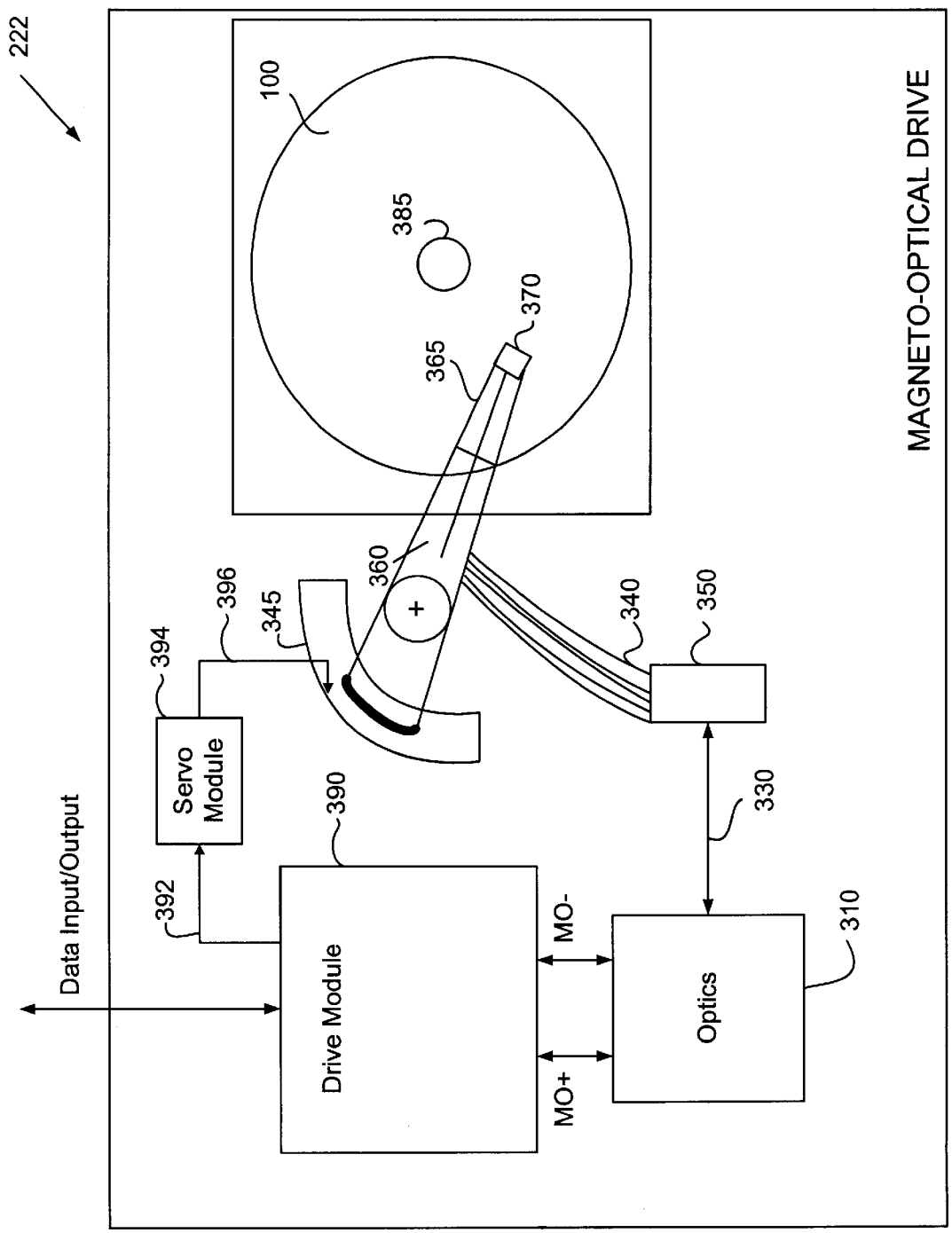
FIG. 3 is a schematic view of the magneto-optical drive of FIG. 2, according to the present invention.

Referring now to FIG. 3, a schematic view of the FIG. 2 MO drive 222 is shown. In accordance with the present invention, the mechanical architecture of MO drive 222 may incorporate Flying Magneto-Optical (FMO) head technology with Winchester-type rotary actuator arm, suspension, and air bearing technology in a MO data storage system. In the preferred embodiment, MO drive 222 includes optics assembly 310, a Single-Mode Polarization Maintaining (SMPM) optical fiber 330, a fiber optic switch 350, an actuator magnet and coil 345, a plurality of SMPM optical fibers 340, a plurality of head arms 360, a plurality of suspensions 365, a plurality of FMO heads 370, a drive module 390, a servo module 394 and a plurality of MO storage media 100.

Each of the plurality of MO storage media 100 are preferably mounted on a spindle 385 for continuous rotation at a constant angular velocity, and each of the plurality of FMO heads 370 are preferably attached via a respective flexible suspension 365 and head arm 360 to the electromagnetic actuator magnet and coil 345. Those skilled in the art will recognize that MO drive 222 may comprise as few as one FMO head 370 and one MO storage medium 100 or an upper and lower FMO head 370 for each of a plurality of MO storage media 100.

Figure 4:
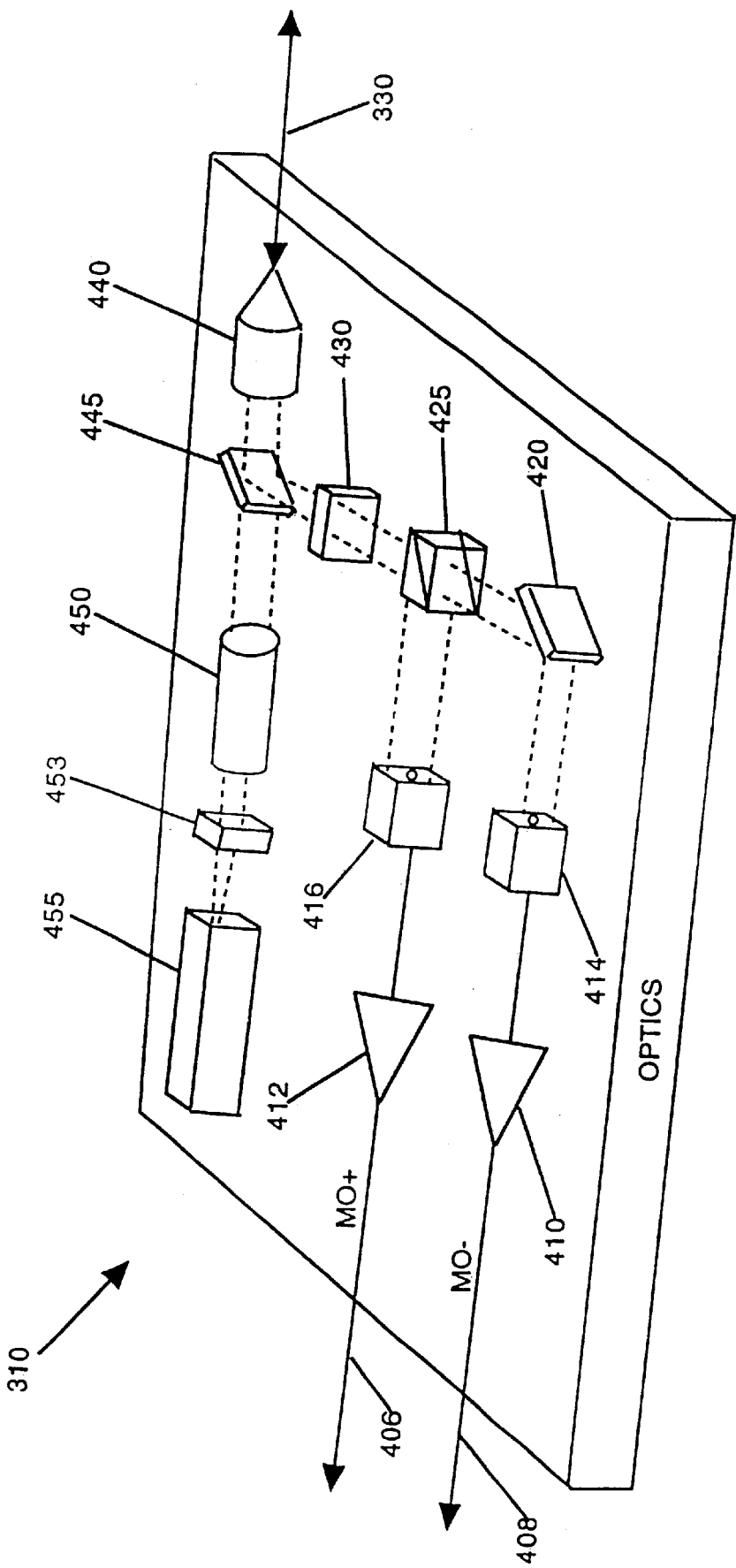
FIG. 4 is a schematic view of the optics assembly of FIG. 3, according to the present invention.

Referring now to FIG. 4, a schematic view of the FIG. 3 optics assembly 310 is shown. Optics assembly 310 includes a photo-detector system and associated optical components, preferably as a separate subassembly 310 or alternatively as a hybrid integrated circuit component. In the preferred embodiment, optics assembly 310 further includes a distributed feedback (DFB) laser diode 455 polarized optical light source operating in the visible or near ultraviolet region, a leaky beam splitter 445, collimating optics 450 and an optical isolator 453 that are used before passing the laser light from the laser diode 455 to leaky beam splitter 445, and a coupling lens 440 preferably comprising a Gradient Refractive Index (GRIN) lens that focuses outgoing light from leaky beam splitter 445 into a Single-Mode Polarization-Maintaining (SMPM) optical fiber 330 feed.

In the preferred embodiment, fiber optic switch 350 (FIG. 3) accepts optical fiber 330 at an input port and routes the light emanating from fiber 330 to one of the optical fibers 340 at an output port. The switching properties of fiber optic switch 350 are bi-directional so that light propagating back to the switch 350 along any one of the SMPM optical fibers 340 at the output port may also be routed to the optical fiber 330 at the input port. The SMPM optical fibers 340 from the fiber optic switch 350 are preferably routed along respective head arms 360 and suspensions 365 to respective flying magneto-optical heads 370.

In the read mode of operation of MO drive 222, light reflected from storage medium 100 couples back through the FMO head 370, one of the plurality of SMPM optical fibers 340, and the fiber optic switch 350, and finally reaches lens 440 via optical fiber 330. Leaky beam splitter 445 then transmits the reflected light through half-wave plate 430 to polarizing beam splitter 425 which discriminates against positive and negative planes of polarization in the received light. Polarizing beam splitter 425 sends reflected light having a positive plane of polarization to photo-detector 416, and also sends reflected light having a negative plane of polarization to photo-detector 414.

Photo-detector 416 responsively converts the positively-rotated light into a proportional analog voltage which is amplified by preamplifier 412 before being transmitted to drive module 390 via line 406. Likewise, photo-detector 414 responsively converts the negatively-rotated light into a proportional analog voltage which is amplified by preamplifier 410 before being transmitted to drive module 390 via line 408.

In addition to data information, storage medium 100 also contains preformed servo information or position marks which MO drive 222 reads and then uses to accurately position head 370 over a selected track on storage medium 100. In the preferred embodiment, the servo or position marks are preformed along the tracks in the plurality of servo sectors 110 which are disposed on the storage medium 100 between the data wedges 106. The present invention detects mispositioning of head 370 with respect to a selected track by processing reflection signals representative of light reflected by position marks. Drive module 390 uses the reflection signals to derive a position error signal (PES) which is provided as feedback via line 392 to servo module 394 (FIG. 3). Servo module 394 then generates a servo control signal which is proportional to the received PES and provides the generated servo control signal via line 396 to actuator 345 which responsively adjusts the position of head 370. In the preferred embodiment, actuator 345 serves as a coarse adjustment to position head 370. FMO head 370 preferably also includes a dynamic mirror which may advantageously deflect the read/write laser beam spot in response to the generated servo control signal to thus provide a fine adjustment for correcting radial position errors of head 370.

Figure 5:
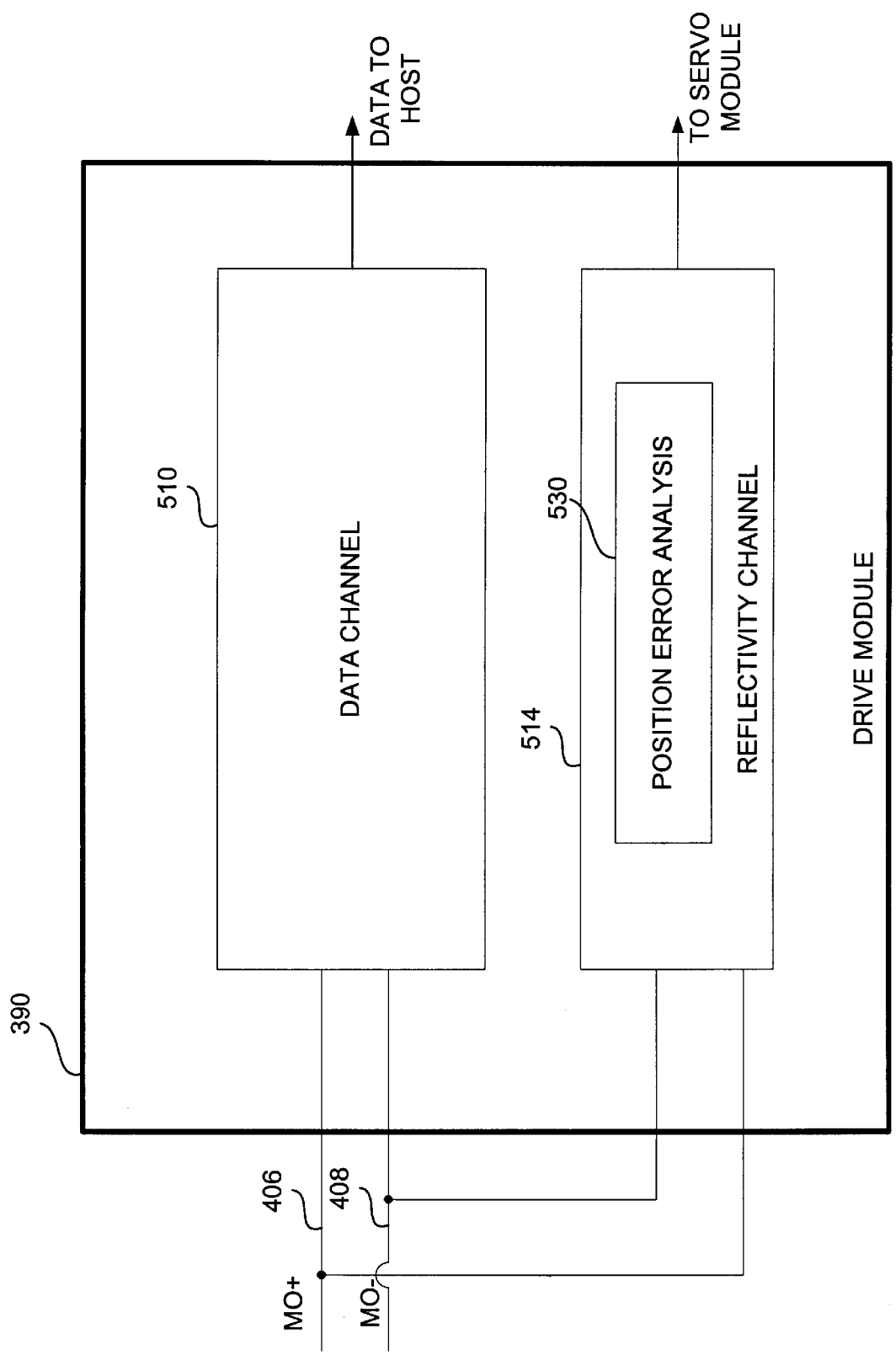
FIG. 5 is a block diagram of the drive module of FIG. 3, according to the present invention.

Referring now to FIG. 5, a schematic diagram of the preferred embodiment for the FIG. 3 drive module 390 is shown. In the preferred embodiment, drive module 390 includes two separate channels (data channel 510 and reflectivity channel 514) because two distinctly different types of light sensing are utilized by magneto-optical drive 222. As discussed above, data channel 510 senses light reflected from the data wedges 106 in the storage medium 100 to determine rotation of the plane of polarization (corresponding to each magnetically-recorded domain) and thus responsively generates corresponding digital data.

In contrast, reflectivity channel 514 senses the amplitude (rather than the polarity) of light reflected from the servo sectors 110 in the storage media 100. For example, during read mode, the amplitude of reflected light is destructively interfered with whenever the reading light beam strikes the pre-patterned position marks embossed upon storage media 100. Reflectivity channel 514 then responsively utilizes the sensed reflection signal to derive position error signals that are then used to adjust and correct the radial position of head 370.

In normal operation, data channel 510 receives the MO+ signal from optics assembly 310 via line 406 and receives the MO− signal from optics assembly 310 via line 408. Data channel 510 responsively processes the MO+ and MO− signals to generate a data signal on line 224.

Reflectivity channel 514 also accesses the MO+ signal via line 560 and the MO− signal via line 564 and responsively processes the reflectivity information to generate a position error signal (PES) which is provided to servo module 394 via line 392. In accordance with the present invention, reflectivity channel 514 includes a position error analysis module 530 which analyzes the received reflectivity information and responsively generates the PES representative of a positioning error of head 370. The operation of position error analysis module 530 will be described in further detail below in conjunction with FIGS. 6–10.

Figure 6:
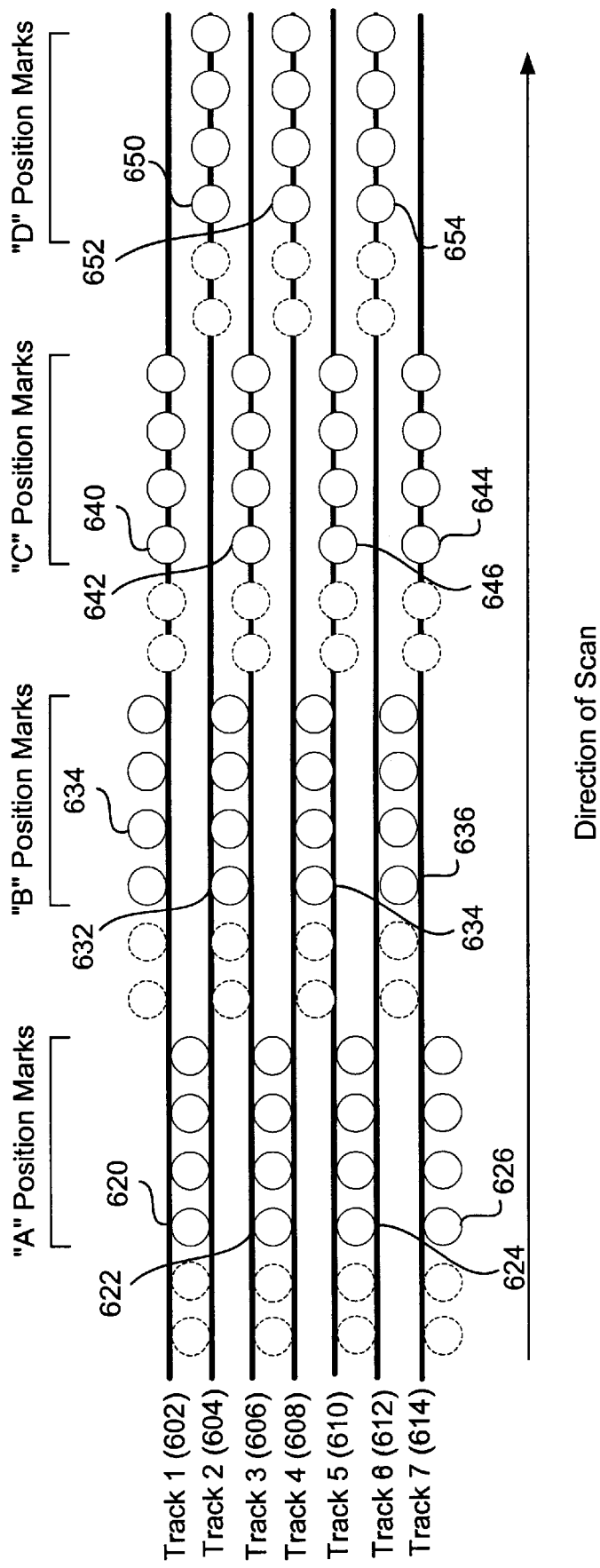
FIG. 6 depicts an arrangement of tracks and associated position marks formed on the MO storage media surface, in accordance with a preferred embodiment of the invention.

FIG. 6 depicts an exemplary arrangement of tracks 602–614 disposed on the surface 102 of MO storage medium 100, each track 602–614 having associated therewith sets of position marks for use in detecting head mispositioning. While a total of seven linear tracks are depicted in the figure, those skilled in the art will recognize that practical implementations of the invention will utilize a much higher number of tracks, and that the track geometry will be circular or spiral rather than linear. Each track 602–614 is provided with at least a set of "A" position marks 620–26 and a set of "B" position marks 630–636. It may be seen that adjacent pairs of tracks 602–614 share a common set of "A" or "B" position marks 620–626 or 630–636. For example, track 1 (602) and track 2 (604) share a common set of equidistantly disposed "A" position marks 620, track 2 (604) and track 3 (606) share a common set of equidistantly disposed "B" position marks 632, and so on. This configuration enables close adjacent spacing of tracks 602–614 to thereby achieve high storage densities. The "A" position marks 620–626 are radially offset from the associated track centerline by a predetermined distance D (equal to ½ of the track pitch in the depicted geometry). The "B" position marks 630–636 are radially offset from the associated track centerline by an equal distance D, but in a direction opposite that of the corresponding "A" position marks.

In accordance with a preferred embodiment, tracks 602–614 are alternately provided with "C" position marks 640–646 or "D" position marks 650–654 disposed on the associated track centerline. As depicted in FIG. 6, "C" position marks 640–646 and "D" position marks 650–654 are provided in a sequentially alternating manner: track 1 (602) is provided with "C" position marks 640 but not "D" position marks, track 2 (604) is provided with "D" position marks 650 but not "C" position marks, and so on. The function of the "C" and "D" position marks will be more fully discussed below in conjunction with FIG. 7.

Each sequentially adjacent set of position marks is shown to be separated by a gap, which is provided to reduce or avoid inter-symbol interference and allow sufficient recovery periods for circuitry of positioning error analysis module 530. Those skilled in the art will recognize that, for better transient performance, each set of position marks may be preceded by and aligned with one or more "leader marks" (which may not used in the area comparison/PES calculation process) formed in surface 102 of MO storage medium 100 and depicted in phantom in FIG. 6.

It will be recognized that the "A", "B", "C" and "D" position marks comprise pits or bumps each having a uniform cross-section, depth and wall slope in order to obtain a uniform peak amplitude reflection signal. It is further noted that the position mark shape and size (relative to spot size) may be adjusted to optimize signal generation and detection. In operation, head 370 is positioned adjacent to a selected track (for example, track 1 (602)), and the light spot emanating from head 370 passes sequentially over "A" position marks 620, "B" position marks 630, "C" position marks 640 and "D" position marks (not present on track 1 (602)) as the disk surface rotates. Each set of position marks generates a corresponding set of pulses (i.e., a servo burst) in the reflection signal. The pulses are subsequently analyzed by position error analysis module 530 to obtain a PES indicative of a positioning error of head 370 relative to track 1 (602).

The functioning of position error analysis module 530 may be best understood with reference to FIGS. 7–10. Referring initially to FIG. 6, position error analysis module 530 comprises a differentiator 702, a low pass filter 704, a second order resonator 706, an integrator 710, and an area comparison module 712. Differentiator 702 is configured to receive the reflection signal derived by summing the MO+ and MO− signals accessed via lines 406 and 408 and is further configured to differentiate the reflection signal, i.e., to generate an output signal representative of the local rate of change of the signal. Differentiator circuits are well known in the art and hence need not be described in detail herein.

Figure 8:
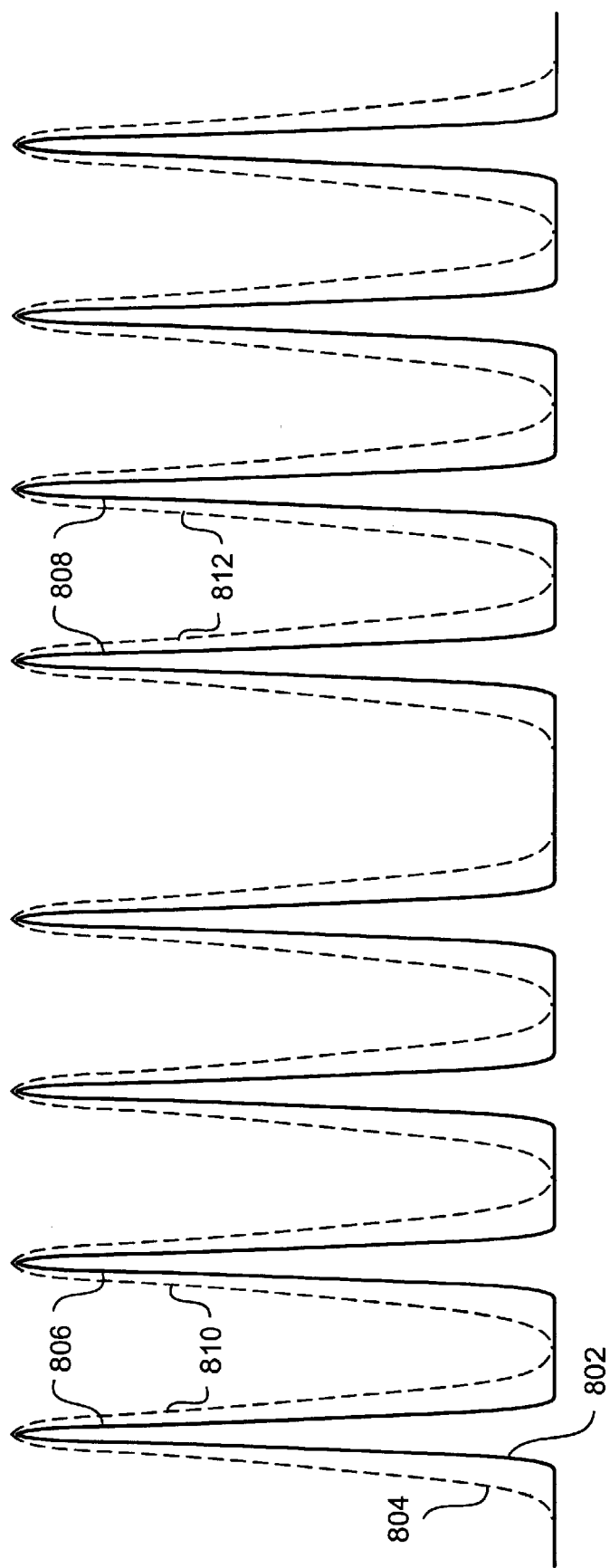
FIG. 8 depicts exemplary reflection signals, corresponding to two tracks at greatly differing radii.
Figure 9:
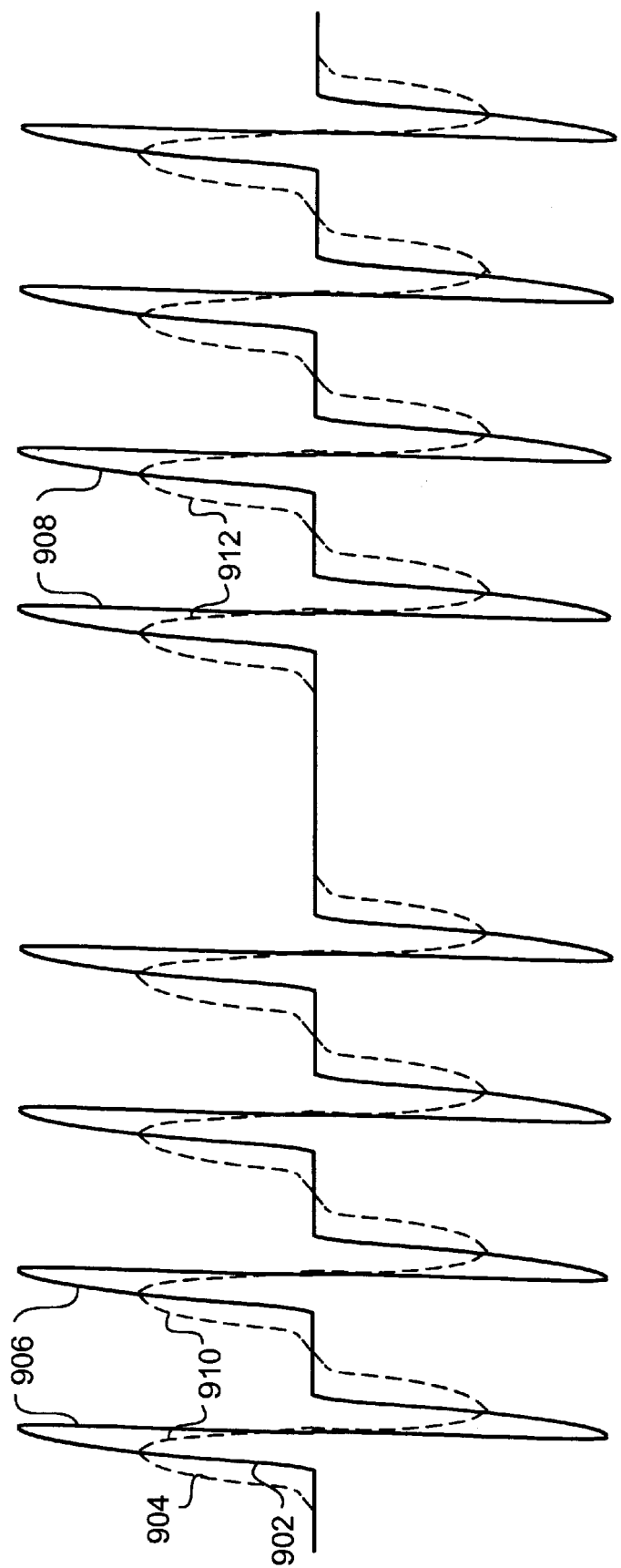
FIG. 9 depicts the exemplary reflection signals of FIG. 8 following differentiation.

The effect of differentiation of the reflection signal is illustrated by FIGS. 8 and 9. FIG. 8 depicts exemplary pre-differentiation reflection signals 802 and 804 respectively corresponding to tracks 1 (602) and 7 (614). Reflection signal 802 includes a first set of pulses or servo burst 806 associated with the reduced reflectivity of "A" position marks 620, and a second set of pulses or servo burst 808 associated with the reduced reflectivity of "B" position marks 630. Those skilled in the art will recognize that the depicted waveforms have been inverted for the purpose of clarity, and that each non-inverted pulse will in actuality comprise a dip or well. Reflection signal 804 (shown as a dotted line in FIG. 8) similarly includes a first set of pulses or servo burst 810 associated with the reduced reflectivity of "A" position marks 626, and a second set of pulses or servo burst 812 associated with the reduced reflectivity of "B" position marks 636.

It is seen that first and second sets of pulses 810 and 812 corresponding to track 7 (614) have substantially greater pulse widths than first and second sets of pulses 806 and 808 corresponding to track 1 (602). As discussed above, the difference in pulse widths results from the variation in local velocity with track radial position. Because track 7 (614) is located relatively closer to the center of MO storage medium 100 than is track 1 (602), the time it takes for the light beam to traverse each of position marks 626 and 636 is greater, causing the pulse width of first and second pulses 810 and 812 to be increased relative to first and second sets of pulses 806 and 808. Because the peak pulse amplitude is invariant with respect to track position, the areas of first and second sets of pulses 810 and 812 corresponding to track 7 (614) are significantly greater than the areas of first and second sets of pulses 806 and 808 corresponding to track 1 (602).

FIG. 9 depicts differentiated signals 902 and 904 respectively corresponding to reflection signals 802 and 804. Differentiated signal 902 includes a first set of differentiated pulses 906 (each pulse comprising a positive portion and a negative portion) corresponding to pulses 806, and a second set of differentiated pulses 908 corresponding to pulses 808. Similarly, differentiated signal 904 includes a first set of differentiated pulses 910 corresponding to pulses 810, and a second set of differentiated pulses 912 corresponding to pulses 812. Differentiation of the reflection signals 902 and 904 acts to eliminate the above-described dependence of pulse area on track position. In particular, differentiated pulses 910 and 912 possess greater pulse widths than differentiated pulses 906 and 908, but the increased pulse widths of differentiated pulses 910 and 912 is exactly offset (with respect to area determination) by the greater peak amplitudes of differentiated pulses 906 and 908.

Figure 7:
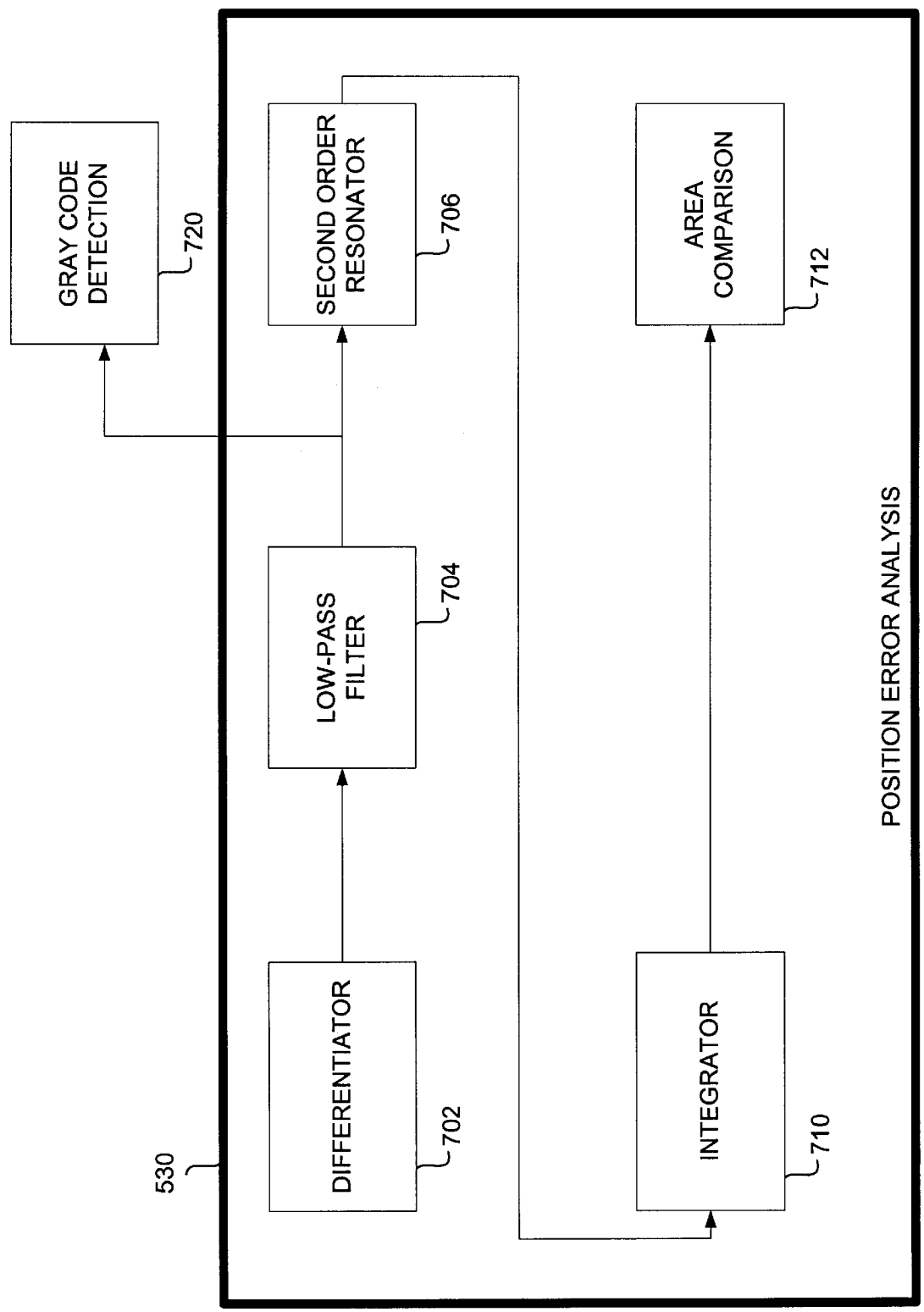
FIG. 7 is a block diagram of the position error analysis module of FIG. 5, according to the present invention.

Referring again to FIG. 7, the differentiated reflection signal is passed through low pass filter 704 and second order resonator 706 to remove, respectively, high-frequency and both low-frequency and high-frequency noise components and thereby maximize the signal-to-noise ratio. Low pass filter 704 comprises conventional circuit components and is operative to filter out, for example, higher frequency thermally generated noise from optical detector 414 and preamplifier 410 in FIG. 4. As shown in FIG. 7, the differentiated reflection signal may be split off after low pass filtering for use by gray code detector 720 in identifying the selected track.

Similarly, second order resonator 706 provides a steep roll-off in the frequency response in order to additionally reduce low-frequency and high-frequency noise contained in the differentiated reflection signal (noting that high-frequency noise tends to be amplified by differentiator 702). Those skilled in the art will recognize that, in addition to filtering out low-frequency and high-frequency noise, resonator 706 has the undesirable effect of adding "ringing" (transients) to the signal, which may lead to inter-symbol interference. A resonator circuit having a relatively low Q-factor (in the range of 1.0–2.0) will achieve satisfactory filtering of high-frequency noise while avoiding excessive transient-caused inter-symbol interference.

Figure 10:
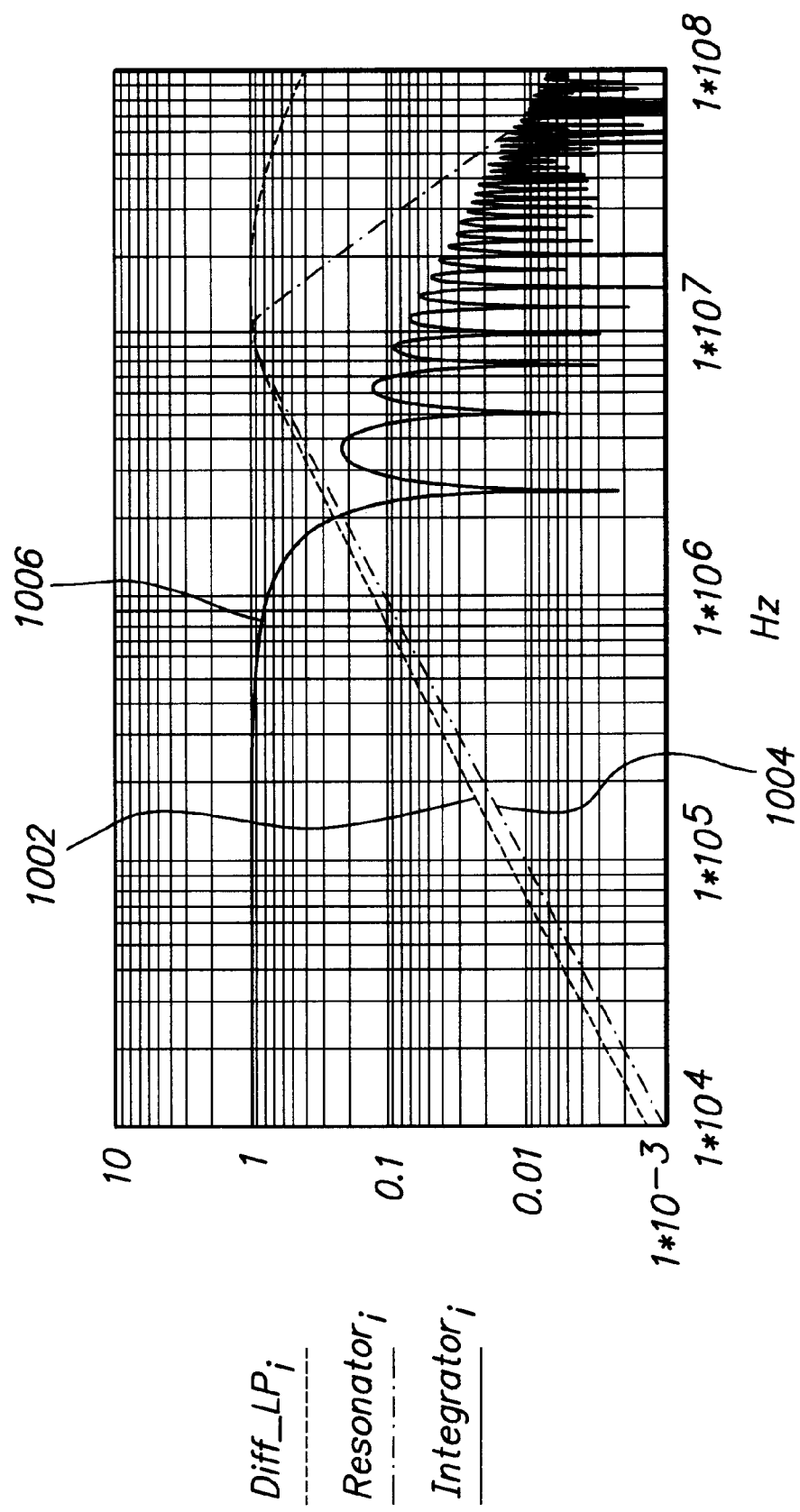
FIG. 10 is a graph showing the frequency response of the several components of the position error analysis module.

FIG. 10 is a graph showing the frequency responses of various components of position analysis module 530. In particular, curve 1002 represents the frequency response of differentiator 702 combined with low pass filter 704. Curve 1004 represents the frequency response when second order resonator 706 is combined with differentiator 702 and low pass filter 704. To optimize performance of position analysis module 530, the second order resonance peak frequency is preferably selected to be equal to the pulse repetition rate. Curve 1006 represents a typical frequency response of integrator 710 (utilized by position analysis module 530 to determine pulse areas, as will be discussed hereinbelow). The frequency response of a position analysis module 530 circuitry, comprising differentiator 702, low pass filter 704, second order resonator 706 and integrator 710, may be derived by multiplying, at each frequency, frequency response curve 1004 (representing differentiator 702, low pass filter 704 and second order resonator 706) by frequency response curve 1006 (representing integrator 710). As may be appreciated by inspection of FIG. 9, the cumulative effect of the several components of position analysis module 530 is to substantially reduce the magnitude of low- and high-frequency noise while maximizing the magnitude of the position information (i.e., the magnitude of the pulses generated by the position marks).

Returning now to FIG. 7, integrator 710 is operative to determine areas associated with each set of differentiated pulses. Integrator 710 conventionally comprises rectifier and finite time integrator circuitry which is gated on at the beginning of each servo burst (each servo burst comprising a set of differentiated pulses representative of a set of position marks) and reset at the end of each servo burst. As described above, gaps or leader marks are positioned between adjacent sets of position marks to allow integrator 710 a sufficient time to reset before receiving the next servo burst.

Finally, area comparison module 712 is configured to receive signals representative of areas of each of the sets of differentiated pulses, and to calculate a PES based on a comparison of the differentiated pulse areas. Area comparison module typically comprises sample-and-hold and analog to digital converter (ADC) circuitry operative to store digitized representations of each differentiated pulse area and determine the PES according to a pre-established equation. In accordance with a conventional PES calculation technique, the PES may be calculated by the following equation:

$$PES=(A-B)/(A+B)$$

where A is the area determined by integrator 710 of the differentiated pulses corresponding to the "A" position marks (for example, differentiated pulses 906 shown in FIGS. 9), and B is the area of the differentiated pulses corresponding to the "B" position marks (for example, differentiated pulses 908).

Figure 11:
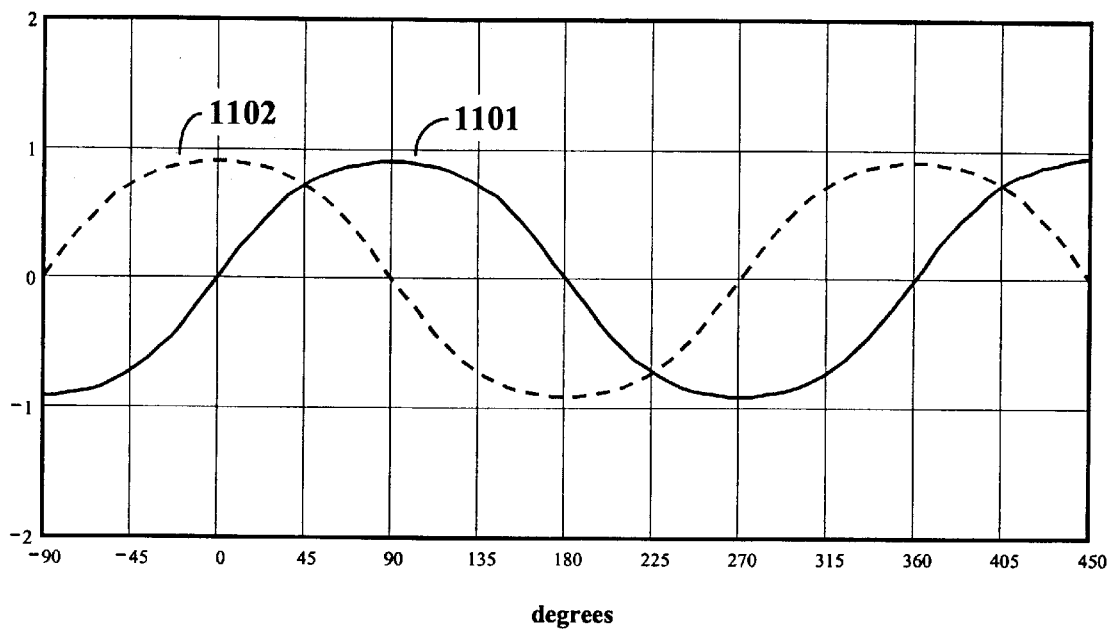
FIG. 11 is a graph showing Position Error Signal (PES) curves, wherein the PES is calculated in accordance with the equation PES=(A+B)/(A−B)

Curve 1101 of FIG. 11 depicts an exemplary PES that is generated by applying the (A−B)/(A+B) equation. The horizontal scale of FIG. 11 represents displacement of the head from a track centerline, and is denoted in degrees where 360 degrees corresponds to a full track pitch. The result of calculating the (A−B)/(A+B) equation while the head is directly adjacent to (i.e., precisely centered about) Track 1 (602) corresponds to the zero degree point on the graph. When the head is directly adjacent to Track 1, the area magnitude of A is equal to the magnitude of B, and therefore the PES is zero as is shown in FIG. 11.

When the head is moved radially toward a higher track number (i.e., toward the center of medium 100), the magnitude of A will increase and the magnitude of B will decrease, as was previously described. Therefore curve 1101 is shown increasing in a positive direction from zero as the number of degrees increases from zero. As is readily evident, the shape of curve 1101 is substantially linear close to zero corresponding to a head position proximate the centerline of track 1 (601). However, as the head is moved away from track 1 (601) centerline, the slope of PES curve 1101 decreases to arrive at a zero slope at the 90 degree point and at the 270 degree point on the graph. The servo system cannot effectively control the position of the head unless the PES has a finite, non-zero slope. Therefore, PES curve 1101 is not useful for servo control around the 90 degree and 270 degree locations of FIG. 11.

If the PES is calculated by the equation PES=(C−D)/(C+D), where C and D are repectively equal to the areas of the differentiated "C" and "D" pulses, then PES curve 1102 will result. It is noted that the PES generated from A and B is 90 degrees out of phase with respect to the PES generated from C and D. Where PES curve 1101 has a slope near zero, PES curve 1102 will have a non-zero slope and an absolute value near zero. Servo module 394 is constructed to use the appropriate PES calculated from either servo bursts A and B or servo bursts C and D so that it can responsively maintain control of the head at all possible radial positions. Normally servo module 394 would use PES equation (A−B)/(A+B) corresponding to curve 1101 in the regions of minus 45 to 45 degrees, 135 to 225 degrees, and 315 to 405 degrees. One with ordinary skill in the art will recognize that 315 to 405 degrees on the curve is the same as minus 45 to 45 degrees on the curve offset by one cycle of repetition. Likewise, servo module 394 would use PES equation (C−D)/(C+D) corresponding to curve 1102 in the regions of 45 to 135 degrees, and 235 to 315 degrees, thereby completing a continuous cycle of the position pattern repetition.

Figure 12:
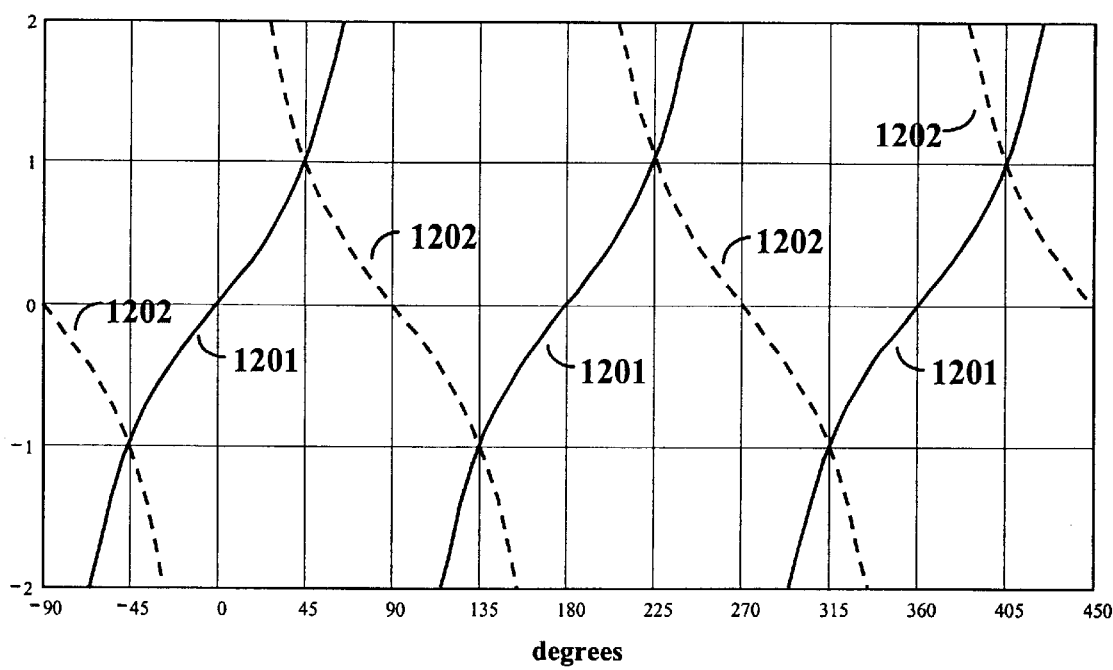
FIG. 12 is a graph showing PES curves, wherein the PES is calculated in accordance with the equation PES=(A−B)/(C−D).

Curve 1201 of FIG. 12 depicts PES curves generated in accordance with the alternate equation PES=(A−B)/(C−D). As can be seen from the figure, PES curve 1201 approaches infinity and goes off the graph, reappearing from the bottom, as the head moves past the 90 degree and 270 degree points of FIG. 12. The reciprocal PES calculation equation (C−D)/(A−B) corresponding to PES curve 1202 is then used by servo module 394 at the places where PES curve 1201 exceeds a value of one (unity). In this case servo module 394 would use PES equation (A−B)/(C−D) corresponding to curve 1201 in the regions of minus 45 to 45 degrees, 135 to 225 degrees, and 315 to 405 degrees of FIG. 12. Additionally, servo module 394 would use PES equation (C−D)/(A−B) corresponding to curve 1202 in the regions of 45 to 135 degrees, and 235 to 315 degrees, thereby completing a continuous cycle of the position pattern repetition.

It should be noted that in spite of the DC offset removal performed by differentiator 702 the values of A, B, C and D may each have a DC offset component introduced by the preceding sample and hold or ADC circuits. Therefore, the denominator of the (A−B)/(C−D) equation will also have a DC offset component (subtraction of the two values cancels out the DC component in the numerator). The presence of a DC offset component may thus compromise the accuracy of the calculated PES.

According to the preferred implementation of the invention, the PES is calculated by the equations:

$$PES=(A-B)/(C-D) \text{ or } PES=(C-D)/(A-B)$$

where A, B, C and D are the areas of the differentiated pulses respectively corresponding to the "A" position marks, "B" position marks, "C" position marks, and "D" position marks as described above. Since the reflection signal corresponding to the non-existent position marks will comprise only a DC offset or baseline signal, the area (C or D) of the differentiated pulses for the non-existent position marks will be representative of the DC offset component of each of the differentiated pulse areas. Thus, the DC offset components in the denominator (C−D) will cancel out, and the PES thus calculated will advantageously be independent of the value of the DC offset component.

Inspection of PES curves 1201 and 1202 of FIG. 12 will reveal that these two curves intersect at plus one (1) and minus one (−1) points of the vertical scale. Inspection of curves 1101 and 1102 of FIG. 11 reveals that these curves intersect at approximately three quarters (0.75) on the vertical scale. In an actual system these application of these PES equations will not result in the idealized curves shown in FIG. 11 and FIG. 12. In many cases the peak amplitude of curve 1101 may differ from the peak amplitude of curve 1102. When these two curves differ in amplitude and servo module 394 switches between curve 1101 curve 1102 for head position control (in order to select the curve exhibiting quasi-linear behavior, as described above), the PES may exhibit discontinuities (instantaneous changes in apparent position or "jumps"). These jumps, also known as stitching point errors, can cause instability and loss of control of the head. The PES equations (A−B)/(A+B) and (C−D)/(C+D)

are subject to this form of stitching point error. However, preferred equation (A–B)/(C–D) and its reciprocal C–D)/(A–B), when used together, always intersect at a value of one (unity) and therefore do not exhibit this form of stitching point error.

While the position error analysis process has been discussed above in the context of an analog reflection signal and analog circuitry components, it should be appreciated that the present invention includes within its scope embodiments wherein software-based differentiation and area detection is applied to a digitized signal.

It will also be recognized by those skilled in the art that, while the invention has been described above in terms of a preferred embodiment, it is not limited thereto. Various features and aspects of the above described invention may be used individually or jointly. Further, although the invention has been described in the context of its implementation in a particular environment and for particular applications, e.g., MO storage devices, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. A method of detecting a head positioning error in a computer storage device, comprising the steps of:
   providing a rotating storage medium having a plurality of generally concentric tracks, each one of the tracks having a first and a second set of optically-detectable position marks disposed along the track, the first and second sets of position marks being radially offset in opposite directions from a centerline of the track;
   directing an incident beam of radiation onto a selected track;
   sensing a reflected beam of radiation from the selected track and responsively generating an electrical reflection signal, the reflection signal having a first and a second set of reflection pulses respectively corresponding to the first and second sets of position marks;
   differentiating the reflection signal to thereby produce a first and a second set of differentiated pulses respectively corresponding to the first and second sets of position marks;
   determining a first area of the first set of differentiated pulses and a second area of the second set of differentiated pulses; and
   comparing the first area to the second area.

2. The method of claim 1, further comprising the step of filtering the reflection signal to remove high-frequency noise components.

3. The method of claim 1, further comprising the step of passing the reflection signal through a resonator to remove high-frequency and low frequency noise components.

4. The method of claim 1, further comprising the steps of:
   providing a third set of position marks disposed on the track centerline, the third set of position marks adding a third set of reflection pulses to the electrical reflection signal;
   differentiating the third set of reflection pulses to produce a third set of differentiated pulses;
   determining a third area of the third set of differentiated pulses; and
   comparing the third area to a fourth area normally representative of an area of a differentiated baseline signal.

5. The method of claim 4, further comprising the steps of:
   determining a first area difference between the first area and the second area;
   determining a second area difference between the third area and the fourth area; and
   dividing the first area difference by the second area difference to thereby generate a position error signal indicative of the head positioning error.

6. The method of claim 5, further comprising the steps of:
   calculating a reciprocal position error signal by dividing the second area difference by the first area difference; and
   using the reciprocal position error signal to correct head position when an absolute value of the position error signal exceeds unity.

7. A head mispositioning detection system for use with a computer storage device, the system comprising:
   a rotating storage medium having a plurality of generally concentric tracks, each one of the tracks having a first and a second set of optically-detectable position marks disposed along the track, the first and the second set of position marks being radially offset in opposite directions from a centerline of the track;
   a head device having a radiation source for directing an incident beam of radiation onto a selected track, and a detector for detecting a reflected beam of radiation from the selected track and responsively generating an electrical reflection signal, the reflection signal having a first and a second set of pulses respectively corresponding to the first and second sets of position marks;
   a differentiator, electrically coupled to the detector, for differentiating the reflection signal to produce a first and a second set of differentiated pulses corresponding to the first and second sets of position marks;
   an integrator, electrically coupled to the differentiator, for determining a first area of the first set of differentiated pulses and a second area of the second set of differentiated pulses; and
   an area comparison module, electrically coupled to the integrator, for comparing the first area to the second area.

8. The system of claim 7, further comprising a filter, coupled to the differentiator, for removing undesirable frequency components of the reflection signal.

9. The system of claim 7, further comprising a second order resonator, coupled to the differentiator.

10. The system of claim 7, wherein:
    the tracks of the rotating medium are further provided with a third set of position marks disposed on the track centerline such that the reflection signal has a third set of pulses corresponding to the third set of position marks;
    the differentiator produces a third set of differentiated pulses corresponding to the third set of position marks;
    the integrator determines a third area of the third set of differentiated pulses; and
    the area comparison module compares the third area to a fourth area normally representative of an area of a differentiated baseline signal.

11. The system of claim 10, wherein the area comparison module is configured to:
    determine a first area difference between the first area and the second area;
    determine a second area difference between the third area and the fourth area; and divide the first area difference by the second area difference to obtain a position error signal representative of a positioning error.

12. The system of claim 11, wherein the area comparison module is further configured to:

divide the second area difference by the first area difference to obtain a reciprocal position error signal; and use the reciprocal error signal to correct head position when an absolute value of the position error signal exceeds unity.

13. The system of claim 7, wherein adjacent tracks of the storage medium share a common set of the first or second sets of position marks.

14. The system of claim 7, wherein the computer storage device comprises a magneto-optical (MO) storage device, and the rotating storage medium comprises an MO storage medium.

15. An apparatus for detecting a head positioning error in a computer storage device, the storage device including a rotating storage medium having a plurality of generally concentric tracks, each one of the tracks having a first and a second set of optically-detectable position marks disposed along the track, the first and the second set of position marks being radially offset in opposite directions from a centerline of the track, the apparatus comprising:

means for directing an incident beam of radiation onto a selected track;

means for sensing a reflected beam of radiation from the selected track and responsively generating an electrical reflection signal, the reflection signal having a first and a second set of reflection pulses respectively corresponding to the first and second sets of position marks;

means for differentiating the reflection signal to thereby produce a first and a second set of differentiated pulses respectively corresponding to the first and second sets of position marks;

means for determining a first area of the first set of differentiated pulses and a second area of the second set of differentiated pulses; and means for comparing the first area to the second area.

16. The apparatus of claim 15, further comprising means for filtering the reflection signal to remove undesirable frequency components.

17. The apparatus of claim 16, further comprising resonator means for further filtering of the reflection signal.

18. The apparatus of claim 15, wherein:

the tracks of the rotating storage medium further include a third set of position marks disposed on the track centerline, the third set of position marks adding a third set of reflection pulses to the electrical reflection signal;

the differentiating means include means for differentiating the third set of reflection pulses to produce a third set of differentiated pulses;

the area determining means includes means for determining a third area of the third set of differentiated pulses; and the area comparing means includes means for comparing the third area to a fourth area representative of an area of a differentiated baseline signal.

19. The apparatus of claim 18, wherein the area comparing means includes:

means for determining a first area difference between the first area and the second area;

means for determining a second area difference between the third area and the fourth area; and means for dividing the first area difference by the second area difference to thereby generate a position error signal indicative of the head positioning error.

20. The apparatus of claim 19, wherein the area comparing means further includes:

means for dividing the second area difference by the first area difference to obtain a reciprocal position error signal, and for using the reciprocal position error signal to correct head position if an absolute value of the position error signal exceeds unity.

* * * * *